(12) United States Patent
Jansen

(10) Patent No.: US 7,864,884 B2
(45) Date of Patent: Jan. 4, 2011

(54) SIGNAL DETECTION IN OFDM SYSTEM

(75) Inventor: Kaj Jansen, Salo (FI)

(73) Assignee: Nokia Corporation, Espoo (FI)

( * ) Notice: Subject to any disclaimer, the term of this patent is extended or adjusted under 35 U.S.C. 154(b) by 875 days.

(21) Appl. No.: 11/412,256

(22) Filed: Apr. 27, 2006

(65) Prior Publication Data

US 2007/0253319 A1    Nov. 1, 2007

(51) Int. Cl.
*H03K 9/00* (2006.01)
(52) U.S. Cl. .................. 375/316; 375/322; 375/324; 375/343; 375/347; 375/349; 370/343; 708/300
(58) Field of Classification Search .............. 375/145, 375/146, 250, 255, 260, 267, 316, 318, 350, 375/343–346, 262, 292, 299, 295, 306, 327, 375/342, 349, 354, 359
See application file for complete search history.

(56) References Cited

U.S. PATENT DOCUMENTS

| | | | |
|---|---|---|---|
| 5,444,697 A | | 8/1995 | Leung et al. |
| 5,852,630 A | * | 12/1998 | Langberg et al. ............ 375/219 |
| 6,122,327 A | | 9/2000 | Watanabe et al. |
| 6,211,924 B1 | | 4/2001 | Patel et al. |
| 6,256,355 B1 | | 7/2001 | Sakoda et al. |
| 6,310,896 B1 | | 10/2001 | Langberg et al. |
| 6,411,662 B1 | | 6/2002 | Sakoda et al. |
| 6,574,283 B1 | | 6/2003 | Sakoda et al. |
| 6,590,860 B1 | | 7/2003 | Sakoda et al. |
| 6,658,063 B1 | | 12/2003 | Mizoguchi et al. |
| 6,711,123 B1 | | 3/2004 | Taira |
| 6,757,550 B1 | | 6/2004 | Yoneyama et al. |
| 6,922,549 B2 | | 7/2005 | Lyons et al. |
| 6,924,763 B2 | | 8/2005 | Poullin |

(Continued)

FOREIGN PATENT DOCUMENTS

EP     1 079 537     2/2001

(Continued)

OTHER PUBLICATIONS

U.S. Appl. No. 11/412,472, filed Apr. 27, 2006, Jansen.

(Continued)

*Primary Examiner*—Shuwang Liu
*Assistant Examiner*—Hirdepal Singh
(74) *Attorney, Agent, or Firm*—Hollingsworth & Funk, LLC

(57) ABSTRACT

A solution for signal detection in a radio receiver receiving multicarrier signals is disclosed. According to the provided solution, the radio receiver receives a radio signal and converts the received radio signal into digital samples. Since a desired signal being detected occupies only a portion of sub-carriers of a signal the radio receiver is configured to receive, the received signal is heavily oversampled. A detection procedure may be simplified by utilizing this oversampling. A relation between the known total bandwidth of the desired signal and the total bandwidth of the received radio signal may be calculated, and utilized in the actual signal detection. The signal detection is based on sliding correlation in which the samples of the received signal are correlated with a reference signal with different phase shifts between the two signals. As the result of the correlation, the received signal is determined to be either the desired signal or noise.

29 Claims, 4 Drawing Sheets

U.S. PATENT DOCUMENTS

| | | | |
|---|---|---|---|
| 6,954,643 B2 | 10/2005 | Petrus | |
| 6,999,025 B2 | 2/2006 | Poullin | |
| 7,043,242 B2 | 5/2006 | Kuiri et al. | |
| 7,047,042 B2 | 5/2006 | Komara et al. | |
| 7,079,480 B2 | 7/2006 | Agee | |
| 7,113,557 B2 | 9/2006 | Kaku et al. | |
| 7,251,282 B2 | 7/2007 | Maltsev et al. | |
| 7,310,503 B2 | 12/2007 | Ido | |
| 7,362,832 B2 | 4/2008 | Yoshida | |
| 7,366,089 B2 | 4/2008 | Tehrani et al. | |
| 7,397,841 B2 | 7/2008 | Suzuki | |
| 7,430,193 B2 | 9/2008 | Kim et al. | |
| 7,430,257 B1 | 9/2008 | Shattil | |
| 7,433,296 B2 | 10/2008 | Tsuie | |
| 7,436,897 B2 | 10/2008 | Sanada et al. | |
| 7,444,145 B2 | 10/2008 | Diener | |
| 7,447,163 B1 | 11/2008 | Thomson et al. | |
| 7,486,726 B2 | 2/2009 | Alexander et al. | |
| 7,502,311 B2 | 3/2009 | Song et al. | |
| 7,545,503 B2 * | 6/2009 | Aiyer | 356/485 |
| 7,545,778 B2 | 6/2009 | Sugar et al. | |
| 7,587,016 B2 | 9/2009 | Gaikwad et al. | |
| 2002/0102941 A1 | 8/2002 | Kuiri et al. | |
| 2002/0150109 A1 | 10/2002 | Agee | |
| 2002/0160737 A1 | 10/2002 | Crawford | |
| 2002/0164968 A1 | 11/2002 | Crawford | |
| 2002/0196731 A1 | 12/2002 | Laroia et al. | |
| 2003/0002471 A1 | 1/2003 | Crawford et al. | |
| 2004/0005018 A1 | 1/2004 | Zhu et al. | |
| 2004/0066331 A1 | 4/2004 | Poullin | |
| 2004/0091057 A1 | 5/2004 | Yoshida | |
| 2004/0179625 A1 * | 9/2004 | Kim | 375/260 |
| 2004/0190560 A1 | 9/2004 | Maltsev et al. | |
| 2004/0229581 A1 | 11/2004 | Mizoguchi et al. | |
| 2004/0233841 A1 | 11/2004 | Sanada et al. | |
| 2004/0240379 A1 | 12/2004 | Tsuie | |
| 2004/0257270 A1 | 12/2004 | Poullin | |
| 2004/0264561 A1 | 12/2004 | Alexander et al. | |
| 2005/0095987 A1 | 5/2005 | Lyons et al. | |
| 2005/0220175 A1 | 10/2005 | Zhou | |
| 2005/0220230 A1 | 10/2005 | Fukuda | |
| 2005/0232217 A1 * | 10/2005 | Do et al. | 370/343 |
| 2005/0265488 A1 | 12/2005 | Jung | |
| 2005/0271026 A1 | 12/2005 | Song et al. | |
| 2006/0013285 A1 | 1/2006 | Kobayashi et al. | |
| 2006/0013326 A1 | 1/2006 | Yoshida | |
| 2006/0013327 A1 | 1/2006 | Sugar et al. | |
| 2006/0153283 A1 | 7/2006 | Scharf et al. | |
| 2006/0166634 A1 | 7/2006 | Ido | |
| 2006/0171367 A1 | 8/2006 | Wang | |
| 2006/0172713 A1 | 8/2006 | Suzuki et al. | |
| 2006/0176093 A1 * | 8/2006 | Song et al. | 327/179 |
| 2006/0209927 A1 * | 9/2006 | Khandekar et al. | 375/146 |
| 2006/0294170 A1 | 12/2006 | Matsuoka et al. | |
| 2007/0019750 A1 | 1/2007 | Gaikwad et al. | |
| 2007/0046536 A1 | 3/2007 | Jia et al. | |
| 2007/0098100 A1 | 5/2007 | Charbit et al. | |
| 2007/0202902 A1 | 8/2007 | Jansen et al. | |
| 2007/0253319 A1 | 11/2007 | Jansen | |
| 2007/0254594 A1 | 11/2007 | Jansen | |
| 2007/0291632 A1 | 12/2007 | Li et al. | |
| 2008/0037691 A1 | 2/2008 | Papathanasiou et al. | |
| 2008/0043858 A1 | 2/2008 | Lim et al. | |
| 2008/0117998 A1 | 5/2008 | Kato | |
| 2008/0211715 A1 | 9/2008 | Feintuch et al. | |
| 2008/0285490 A1 | 11/2008 | Mukai et al. | |
| 2008/0317150 A1 | 12/2008 | Alexander et al. | |
| 2009/0129489 A1 * | 5/2009 | Eldar et al. | 375/260 |
| 2009/0175362 A1 | 7/2009 | Priotti | |
| 2009/0201797 A1 | 8/2009 | Suzuki et al. | |
| 2009/0225910 A1 | 9/2009 | Suzuki et al. | |
| 2009/0290665 A1 | 11/2009 | Yoshida et al. | |

FOREIGN PATENT DOCUMENTS

| | | |
|---|---|---|
| EP | 1635494 | 3/2006 |
| GB | 2 345 831 A | 7/2000 |
| WO | 00/31659 | 6/2000 |
| WO | WO 2005062728 | 7/2005 |

OTHER PUBLICATIONS

Office Action dated Jul. 29, 2010 from U.S. Serial No. 11/412,472, 13 pages.

Office Action Response dated Sep. 29, 2010 from U.S. Appl. No. 11/412,472, 14 pages.

* cited by examiner

SIGNAL DETECTION IN OFDM SYSTEM

FIELD

The invention relates generally to signal processing carried out in a radio receiver, and particularly to signal detection in a radio receiver capable of receiving and processing signals transmitted according to a multicarrier data transmission scheme.

BACKGROUND

Multicarrier data transmission schemes have been widely studied and, to some degree, employed as high-speed wireless data transmission schemes between two independent communication devices or in wireless telecommunication systems. Such multicarrier data transmission schemes include, for example, an Orthogonal Frequency Division Multiplexing (OFDM) scheme. In multicarrier systems, several data symbols are typically transmitted in parallel on a plurality of subcarriers. In order to enable data transmission between a transmitter and a receiver, the receiver must be able to detect a given synchronization or pilot signal transmitted by the transmitter. The synchronization or pilot signal may be attenuated due to fading caused by a radio channel and, thus, it may arrive at a very low power level at the receiver. Thus, an efficient signal detection method is needed for detecting synchronization signals and/or pilot signals within a multicarrier signal received in a radio receiver.

In OFDM systems, signal detection may be carried out either in a time or a frequency domain. Signal detection is typically based on correlation of a received signal processed for detection. A signal detection procedure may be blind or pilot assisted. In blind signal detection, autocorrelation properties of the received signal, particularly the correlation properties caused by the use of a cyclic prefix, are typically employed. In pilot assisted signal detection, the received signal is correlated with a known signal, and if the two signals have enough correlation, it is determined that the signal has been detected.

In OFDM systems, a pilot signal is typically transmitted on a given subcarrier or subcarriers of a multicarrier signal. A radio receiver receives the multicarrier signal and, in an A/D converter, converts it into digital samples having a given sample rate. Then, the radio receiver extracts the pilot signal from the multicarrier signal, for example by filtering the multicarrier signal. Since the pilot signal represents only a fraction of the total bandwidth of the multicarrier signal, processing the pilot signal with the sample rate resulting from the A/D conversion results in unnecessary calculations and in large memory sizes. This increases the complexity, cost, and power consumption of the radio receiver.

BRIEF DESCRIPTION OF THE INVENTION

An object of the invention is to provide an improved solution for signal detection in a radio receiver.

According to an aspect of the invention, there is provided a signal detection method in a radio receiver. The method comprises receiving a radio signal, converting the received radio signal into a digitized signal comprising digital samples, calculating a sample shift value according to a relation between the known bandwidth of a desired signal the radio receiver is attempting to detect and the total bandwidth of the received radio signal, comparing the digital samples of the digitized signal with digital samples of a reference signal with different sample shifts between the two signals, the sample shifts being defined by the calculated sample shift value, and determining, on the basis of the result of the comparison, whether or not the received radio signal is the desired signal.

According to another aspect of the invention, there is provided a signal detection method in a radio receiver. The method comprises receiving a radio signal, converting the received radio signal into a digitized signal comprising digital samples, calculating an oversampling definition value according to a relation between the known bandwidth of a desired signal the radio receiver is attempting to detect and the total bandwidth of the received radio signal, summing together a number of consecutive samples of the digitized received signal, the number of consecutive samples to be summed being defined by the oversampling definition value, thereby obtaining summed digital samples of the digitized received signal, comparing the summed digital samples with digital samples of a reference signal with different sample shifts between the two signals, and determining, on the basis of the result of the comparison, whether or not the received radio signal is the desired signal.

According to another aspect of the invention, there is provided a radio receiver comprising a communication interface configured to receive radio signals, and a processing unit. The processing unit is configured to receive, through the communication interface, a radio signal, convert the received radio signal into a digitized signal comprising digital samples, select a sample shift value according to a relation between the known bandwidth of a desired signal the radio receiver is attempting to detect and the total bandwidth of the received radio signal, compare the digital samples of the digitized signal with digital samples of a reference signal with different sample shifts between the two signals, the sample shifts being defined by the calculated sample shift value, and determine, on the basis of the result of the comparison, whether or not the received radio signal is the desired signal.

According to another aspect of the invention, there is provided a radio receiver comprising a communication interface configured to receive radio signals, and a processing unit. The processing unit is configured to receive, through the communication interface, a radio signal, convert the received radio signal into a digitized signal comprising digital samples, calculate an oversampling definition value according to a relation between the known bandwidth of a desired signal the radio receiver is attempting to detect and the total bandwidth of the received radio signal, sum together a number of consecutive samples of the digitized received signal, the number of consecutive samples to be summed being defined by the oversampling definition value, thereby obtaining summed digital samples of the digitized received signal, compare the summed digital samples with digital samples of a reference signal with different sample shifts between the two signals, and determine, on the basis of the result of the comparison, whether or not the received radio signal is the desired signal.

According to another aspect of the invention, there is provided a mobile terminal for use in a wireless communication network. The mobile terminal comprises a radio receiver configured to receive a radio signal, convert the received radio signal into a digitized signal comprising digital samples, select a sample shift value according to a relation between the known bandwidth of a desired signal the radio receiver is attempting to detect and the total bandwidth of the received radio signal, compare the digital samples of the digitized signal with digital samples of a reference signal with different sample shifts between the two signals, the sample shifts being defined by the calculated sample shift value, and determine, on the basis of the result of the comparison, whether or not the received radio signal is the desired signal.

According to another aspect of the invention, there is provided a mobile terminal for use in a wireless communication network. The mobile terminal comprises a radio receiver configured to receive a radio signal, convert the received radio signal into a digitized signal comprising digital samples, calculate an oversampling definition value according to a relation between the known bandwidth of a desired signal the radio receiver is attempting to detect and the total bandwidth of the received radio signal, sum together a number of consecutive samples of the digitized received signal, the number of consecutive samples to be summed being defined by the oversampling definition value, thereby obtaining summed digital samples of the digitized received signal, compare the summed digital samples with digital samples of a reference signal with different sample shifts between the two signals, and determine, on the basis of the result of the comparison, whether or not the received radio signal is the desired signal.

According to another aspect of the invention, there is provided a computer program distribution medium readable by a computer and encoding a computer program of instructions for executing a computer process for signal detection in a radio receiver. The process comprises receiving a radio signal, converting the received radio signal into a digitized signal comprising digital samples, calculating a sample shift value according to a relation between the known bandwidth of a desired signal the radio receiver is attempting to detect and the total bandwidth of the received radio signal, comparing the digital samples of the digitized signal with digital samples of a reference signal with different sample shifts between the two signals, the sample shifts being defined by the calculated sample shift value, and determining, on the basis of the result of the comparison, whether or not the received radio signal is the desired signal.

According to another aspect of the invention, there is provided a computer program distribution medium readable by a computer and encoding a computer program of instructions for executing a computer process for signal detection in a radio receiver. The process comprises receiving a radio signal, converting the received radio signal into a digitized signal comprising digital samples, calculating an oversampling definition value according to a relation between the known bandwidth of a desired signal the radio receiver is attempting to detect and the total bandwidth of the received radio signal, summing together a number of consecutive samples of the digitized received signal, the number of consecutive samples to be summed being defined by the oversampling definition value, thereby obtaining summed digital samples of the digitized received signal, comparing the summed digital samples with digital samples of a reference signal with different sample shifts between the two signals, and determining, on the basis of the result of the comparison, whether or not the received radio signal is the desired signal.

Advantages provided by the invention include a smaller hardware size and a smaller number of operations to be performed by a processing unit of a radio receiver. Accordingly, the power consumption of the radio receiver is decreased, which is an important factor in mobile communication devices, such as mobile phones.

LIST OF DRAWINGS

In the following, the invention will be described in greater detail with reference to embodiments and the accompanying drawings, in which FIG. 1 illustrates a block diagram of an exemplary communication system in which embodiments of the invention may be implemented;

DESCRIPTION OF EMBODIMENTS

Figure 1:
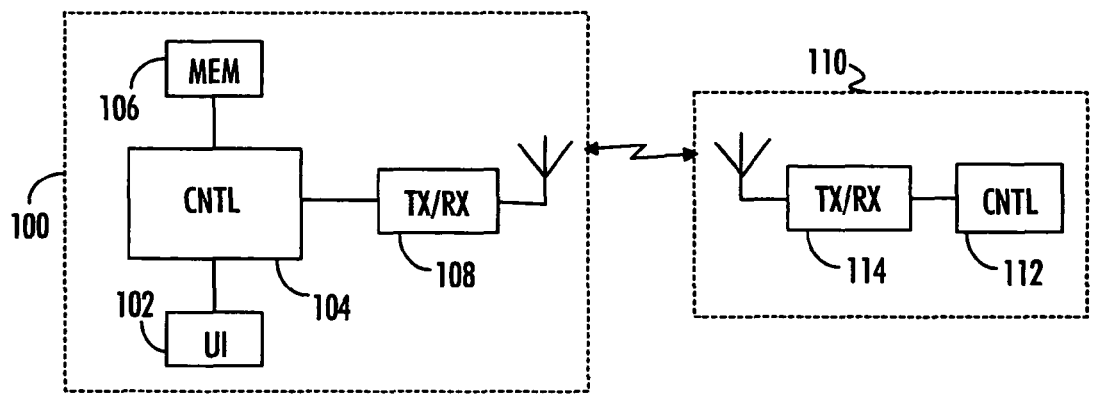

With reference to FIG. 1, examine an example of a communication system to which embodiments of the invention can be applied. The communication system may be a mobile communication system, such as a Universal Mobile Telecommunications system (UMTS). The mobile communication system may provide high-speed packet data services to mobile stations located within the coverage area of the system. Such a service may be, for example, a High-Speed Downlink Packet Access (HSDPA) service. Alternatively, the communication system may comprise two independent communication devices, for example two mobile phones communicating with each other wirelessly. The communication system may utilize a multicarrier data transmission scheme, such as Orthogonal Frequency Division Multiplexing (OFDM).

With reference to FIG. 1, examine an example of a structure of a radio receiver 100 to which embodiments of the invention can be applied. The radio receiver 100 in FIG. 1 is a radio receiver 100 capable of wireless communications and at least receiving information transmitted through a radio channel. The radio receiver 100 may be capable of receiving information transmitted according to OFDM technique. The radio receiver 100 may, for example, be a personal communication or information-processing device, such as a computer, a PDA (Personal Digital Assistant), or a mobile phone. Furthermore, the radio receiver may be a component of an electronic device, being configured to receive radio signals and process them according to embodiments of the invention.

The radio receiver 100 comprises a communication interface 108 for receiving information transmitted through a radio channel. The communication interface 108 may be a reception unit configured to receive information transmitted by using any communication technique stated above. The communication interface 108 may be configured to process received information signals to a certain degree. The communication interface 108 may be configured to filter and amplify the received information signals as well as to convert the analog information signals into a digital form. In addition to receiving information signals, the communication interface 108 may be configured to transmit information signals through the radio channel.

The radio receiver 100 further comprises a processing unit 104 configured control operations of the radio receiver 100. The processing unit 104 may be configured to process information received through the communication interface 108. In particular, the processing unit 104 may be configured to perform digital signal processing algorithms on the received information in order to reliably detect a transmitted information signal. The processing unit 104 may be implemented with a digital signal processor provided with suitable software embedded on a computer readable medium, or with separate logic circuits, for example with ASIC (Application Specific Integrated Circuit).

The radio receiver 100 may further comprise a memory unit 106 for storing information. The memory unit 106 may be of any non-volatile memory type. The memory unit 106 may store software necessary for the operation of the radio receiver, but also specific parameters necessary for the reception and processing of radio signals.

The radio receiver 100 may additionally comprise a user interface 102 for interaction between the radio receiver and a user of the radio receiver 100. The user interface 102 may include an input device, such as a keyboard or a keypad, a display device, a microphone and a loudspeaker.

The radio receiver 100 may have a communication connection with a radio transmitter 110 comprising a communication interface 114 and a processing unit 112. The radio transmitter 110 may have the capability of transmitting information according to OFDM technique, i.e. the capability of transmitting multicarrier OFDM signals. The radio transmitter 110 may be, for example, a base station capable of providing to the radio receiver 100 with services.

Next, signal detection carried out in the radio receiver 100 according to an embodiment of the invention will be described with the reference to FIGS. 2 to 4. Let us assume that the radio receiver 100 is a mobile station attempting to detect a synchronization signal transmitted from a base station 110 of a mobile telecommunication system. The mobile station may be attempting to detect the synchronization signal in order to identify the base station for data transmission purposes.

Figure 2:
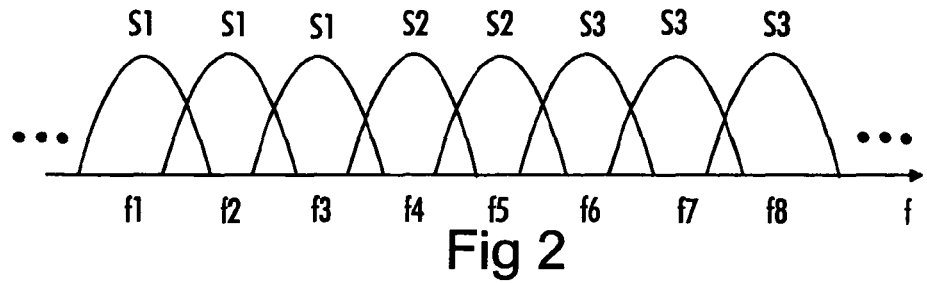
FIG. 2 illustrates an example of a frequency spectrum of a multicarrier signal received in a radio receiver according to an embodiment of the invention.

FIG. 2 illustrates an example of a frequency domain representation of an OFDM signal which may be received in the mobile station. As is well known in the art, an OFDM signal is a multicarrier signal which comprises a plurality of subcarriers centered at different frequencies. As illustrated by FIG. 2, the frequency spectrum of the subcarriers may overlap. According to OFDM transmission technique, data is transmitted on a plurality of subcarriers during an OFDM symbol interval. Within one OFDM symbol interval, one OFDM symbol is carried by a given subcarrier. Additionally, the subcarrier carries a cyclic prefix which is commonly used in an OFDM system for reducing inter-symbol interference. The cyclic prefix is typically a tail portion of the transmitted OFDM symbol waveform inserted at the start of the actual OFDM symbol.

As illustrated by FIG. 2, a given signal may be transmitted on every subcarrier of the multicarrier OFDM signal, or only on given subcarriers. According to the latter scheme, the subcarriers of the multicarrier OFDM signal may be allocated to a plurality of different signals during the OFDM symbol interval. In FIG. 2, the subcarriers of the multicarrier OFDM signal have been allocated to three signals S1, S2, and S3. Signal S1 is located at subcarriers having center frequencies at f1, f2, and f3; signal S2 is located at subcarriers having center frequencies at f4 and f5; and signal S3 is located at subcarriers having center frequencies at f6, f7, and f8. Let us assume that signal S2 is the desired signal the mobile station is attempting to detect. Signal S2 may be, for example, a synchronization signal being transmitted by a base station. The mobile station may attempt to detect the synchronization signal so that it can identify the base station transmitting the synchronization signal. Identification of different base stations from which the mobile station receives radio signals is important for handover and cell selection purposes.

The performance of a signal detection scheme may be determined by the amount of correct signal detections relative to false alarms. A false alarm means that other signals, such as noise, has been detected as a desired signal (e.g. the synchronization signal). In such a case, the receiver attempts to synchronize with the wrong signal, or even with noise, which causes unnecessary operations in the receiver. Signal detection is typically based on comparison between correlation properties of the received signal and a threshold value. On the basis of that comparison, the received signal is determined to be either a desired signal or noise. The threshold value should be set such that, on one hand, the signal detector is able to detect even weak signals but, on the other hand, minimizes false alarms, i.e. detection of noise as a desired signal.

A signal detection procedure is now described with reference to FIG. 3A. Accordingly, a mobile station attempts to detect a synchronization signal within a received radio signal. The received radio signal may first be filtered and converted into a baseband (not shown in FIG. 3A). Then, the received analog signal is converted into digital samples in an analog-to-digital converter (A/D converter) 300. The conversion is carried out with a specific sampling rate. The sampling rate of the A/D converter 300 depends on the bandwidth of the received radio signal. Preferably, the sampling rate should fulfill the Nyquist sampling criterion.

If subcarriers known to be carrying the desired signal are not yet at the baseband, they may be downconverted to the baseband after the A/D conversion. If the subcarriers known to be carrying the desired signal are located at the center frequencies of the multicarrier signal the radio receiver is configured to receive, the subcarriers may already be at the baseband. On the other hand, if the subcarriers known to be carrying the desired signal are not at the center frequencies of the multicarrier signal, they may be converted into the base band at this stage by multiplying the received signal with a signal having a desired center frequency.

Then, the digital samples of the received signal are fed to a buffer 304 for correlation with a reference signal. Preferably, the buffer 306 is a circular buffer. The buffer 304 may comprise a given number of samples for correlation. The buffer may continuously receive new signal samples from the A/D converter 300 and replace the oldest digital samples with the new samples. Accordingly, newest signal samples are always available for correlation. The buffer 304 may also be used to compensate different processing rates of units before and after the buffer 304. For example, a unit which obtains the samples from the buffer may operate at a rate lower than that of the A/D converter 300 (the sampling rate). Accordingly, multiple samples in the buffer 304 may be replaced by new samples between consecutive procedures carried out by that unit.

Since the frequency band of the desired signal is lower than the total bandwidth of the received signal, the A/D converted signal is now heavily oversampled. This feature may be utilized in simplifying the correlation procedure.

The correlation procedure is carried out in a correlator. The correlator may be a sliding correlator which correlates a received signal with a reference signal with different sample shifts between the two signals. Since the radio receiver 100 has no knowledge of the phase of the received signal, it has to correlate the received signal with the reference signal with every sample shift (or time shift) in order to reliably determine whether or not the received signal is the desired signal or noise. Accordingly, the correlation is carried out with sample shifts of one sample between the received signal and the reference signal. This means that after correlation with a given sample shift between the two signals, one of the two signals is shifted by one sample with respect to the other signal for the following correlation. Correlation with a given sample shift produces a correlation value which indicates whether or not the desired signal is detected with that sample shift.

Figure 3A:
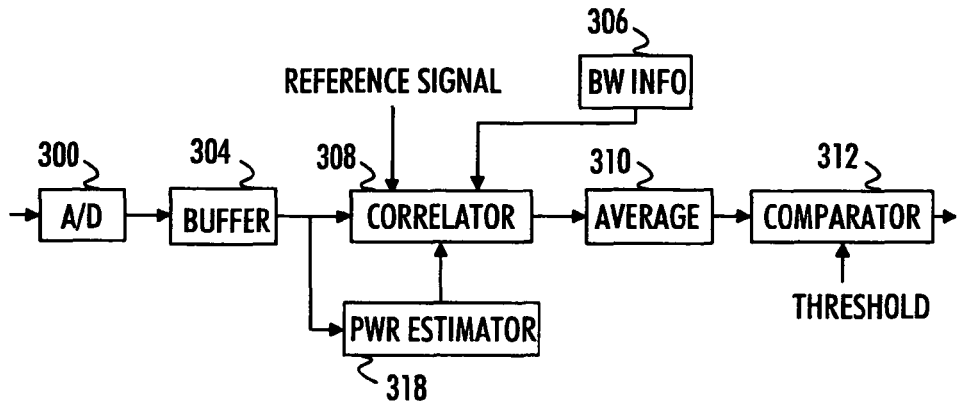
FIG. 3A illustrates a signal detection procedure carried out in a radio receiver according to an embodiment of the invention.
Figure 3B:
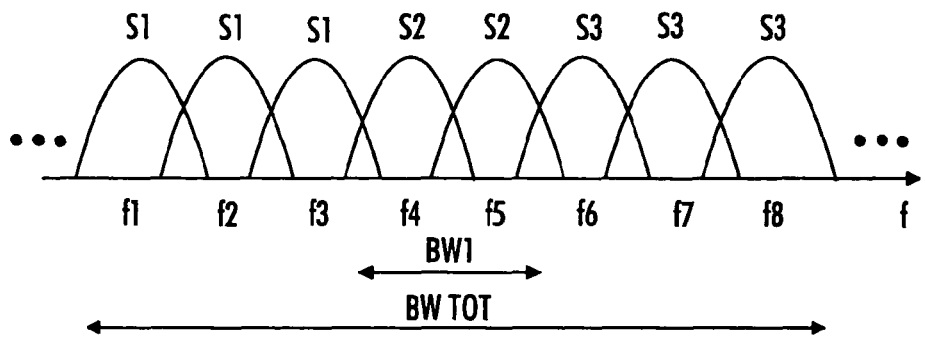
FIG. 3B illustrates utilization of a structure of a received multicarrier signal in a signal detection procedure according to an embodiment of the invention.

Since the signal stored into the buffer 304 is now oversampled with respect to its bandwidth, there is no need to correlate with sample shifts of one sample in a sliding correlator (correlator 308 in FIG. 3A). Two consecutive correlations would only yield substantially the same results, since the received signal does not change significantly with such a small sample shift. The sample shift to be utilized in the correlator 308 depends on the relation between the total bandwidth of the subcarriers known to be carrying the desired signal and the total bandwidth of the received radio signal. Consequently, a sample shift value N may be selected by dividing the total bandwidth of the received radio signal by the total bandwidth of the subcarriers known to be carrying the desired signal. This embodiment is illustrated in FIG. 3B in which signal S2 is again the desired signal the radio receiver is attempting to detect. As can be seen in FIG. 3B, the desired signal S2 is carried by subcarriers located at frequencies f4 and f5 having a combined total bandwidth BW1. Let us assume that the received radio signal has the total bandwidth BW TOT, as FIG. 4 illustrates. In this example, the radio receiver is configured to receive an OFDM multicarrier signal comprising eight subcarriers. In practice, the total number of subcarriers in the OFDM multicarrier signal may be significantly higher but, for the sake of simplicity, let us now consider eight subcarriers. The ratio between the total bandwidth of the received radio signal BW TOT and the total bandwidth of the subcarriers carrying the desired signal BW1 is substantially the same as the ratio between the total number of subcarriers and the number of selected subcarriers. Accordingly, L may be obtained as:

$$L = \frac{P_s}{P_{tot}} \approx \frac{BW\ TOT}{BW1}, \quad (1)$$

where $P_s$ is the number of selected subcarriers and $P_{tot}$ is the total number of subcarriers in an OFDM signal the radio receiver is configured to receive. In our example, two of the eight subcarriers are selected and, thus, L=8/2=4. This means that the correlation between the samples in the buffer 304 and the samples of the reference signal is carried out with cumulative sample shifts of four samples. In practice, the first correlation is carried out with a sample shift between the signal in the buffer 304 and the reference signal being zero, the second correlation is carried out with sample shift of four samples, the third correlation is carried out with sample shift of eight samples, and so on. The sample shift value L may be calculated in a bandwidth information unit 306.

The correlator 308 and a power estimator 318 collect the samples from the buffer 304 for correlation. The correlator 308 also obtains a reference signal and the sample shift value L. The correlator 308 correlates the samples obtained from the buffer 304 with the samples of the reference signal in order to calculate a correlation value. The reference signal may be stored previously in the memory unit 106 of the radio receiver 100. If the signal obtained from the buffer 304 is S(n) and the reference signal is SR(n), both comprising N (n=1 to N) samples, the correlation value may be calculated according to the following equation:

$$C = \sum_N S(n - kL)SR^*(n), \quad (2)$$

where k is an integer which is incremented after each correlation, and $(\cdot)^*$ denotes a complex conjugate. When the correlation has been calculated with every phase shift between the received signal and the reference signal, k is set to zero. At this stage, it should be noted that the mobile station has the knowledge of the waveform of the transmitted synchronization signal it is attempting to detect and the reference signal has the corresponding waveform. In an ideal situation when the received signal is actually the signal the radio receiver is attempting to detect, S(n)=SR(n).

The correlator 308 correlates the samples obtained from the buffer 304 with the samples of the reference signal with a given sample shift between the two signals. The correlator 308 may obtain the sample shift value L to be used from a bandwidth information unit 306. The sample shifts to be utilized by the correlator are defined by the sample shift value L. Accordingly, the correlator 308 may calculate equation (2) with different sample shifts L between signals S(n) and SR(n), thereby producing a correlation value C for each sample shift. For each correlation procedure, i.e. calculation of equation (2), the correlator obtains the samples from the buffer 304. Between consecutive correlation procedures, new digital samples may have arrived to the buffer to replace the oldest samples. Consequently, the correlator 308 may calculate consecutive correlation procedures with a different sample set.

In the example described above, and particularly in equation (2), the received signal S was shifted with respect to the reference signal SR. Equivalently, the reference signal SR may be shifted with respect to the received signal.

The correlation may be carried out for the actual OFDM symbol part, but also a cyclic prefix may be included in the correlation procedure. After all, the cyclic prefix is also a known portion of the signal the mobile station is attempting to detect.

The power estimator 318 estimates the reception power of the signal S obtained from the buffer 304, i.e. the reception power of the signal S on the subcarriers f4 and f5. The power estimator 318 may calculate the reception power value P according to the following equation:

$$P = \sum_N |S(n)|^2. \quad (3)$$

The power estimator 318 then outputs the calculated reception power value of the signal S to the correlator 308. The power estimator 318 collects the samples for each reception power estimation procedure from the buffer 304 as well. Consequently, the power estimator 318 may also calculate consecutive reception power estimation procedures with a different sample set.

The correlator 308 then normalizes the power of the correlation value C with the calculated reception power value P. The power normalization may be carried out by dividing the correlation value C by the reception power value P. The purpose of the power normalization is to remove the effect of the reception power on the correlation value. As a result, the correlator 308 outputs a decision metric which is fed to an averaging unit 310.

If the same signal the mobile station is attempting to detect is transmitted with diversity, e.g. several times, the mobile station may improve the accuracy of the decision metric through averaging. Accordingly, the mobile station receives another radio signal and performs the same procedures described above with respect to the firstly received radio signal. The correlator 308 may calculate another decision metric for the newly received radio signal according to method described above and output the decision metric to the averaging unit 310. The averaging unit 310 may then calculate an average decision metric by averaging the received decision metrics. The averaging unit 310 outputs the averaged decision metric to a comparator 312.

The comparator 312 compares the received decision metric with a threshold value in order to determine whether or not the received signal S has enough correlation with the reference signal SR, i.e. whether or not the received signal is the desired signal S2 or noise. The threshold value may be stored previously in the memory unit 106. Alternatively, the threshold value may be calculated for each signal detection procedure separately on the basis of the calculated reception power value. In such a case, there is no need to normalize the power of the correlation value, since the reception power is taken into account in the threshold. If the decision metric is higher than the threshold value, the comparator 312 determines that the received signal S is the desired signal (the synchronization signal S2). Accordingly, the comparator 312 may output a signal which informs other parts of the mobile station that the desired signal has been detected. Accordingly, the mobile station may initialize other procedures in order to process the detected desired signal. On the other hand, if the decision metric is lower than the threshold value, the comparator 312 determines that the received signal S is noise. Accordingly, the comparator 312 may output a signal which indicates that no desired signal was found in the received signal.

Averaging of the plurality of decision metrics improves the performance of the signal detection scheme. For example, if a firstly transmitted synchronization signal is weak due to severe fading in a radio channel, the received synchronization signal may not correlate sufficiently with the reference signal in order to be detected. But if the same synchronization signal transmitted thereafter has not suffered from the severe fading, this received synchronization signal correlates well with the reference signal and may raise the decision metric over the threshold level after averaging such that the synchronization signal is detected.

The correlation procedure according to this embodiment of the invention reduces the frequency of correlations the correlator 308 has to perform. Accordingly, the complexity and the power consumption of the radio receiver 100 are reduced. Additionally, no additional and separate filter to attenuate undesired subcarriers (subcarriers known not to be carrying the desired signal) is needed before the correlator 308. Corresponding filtering is included in the correlation procedure according to this embodiment of the invention. This further reduces the complexity of the radio receiver 100.

Figure 4:
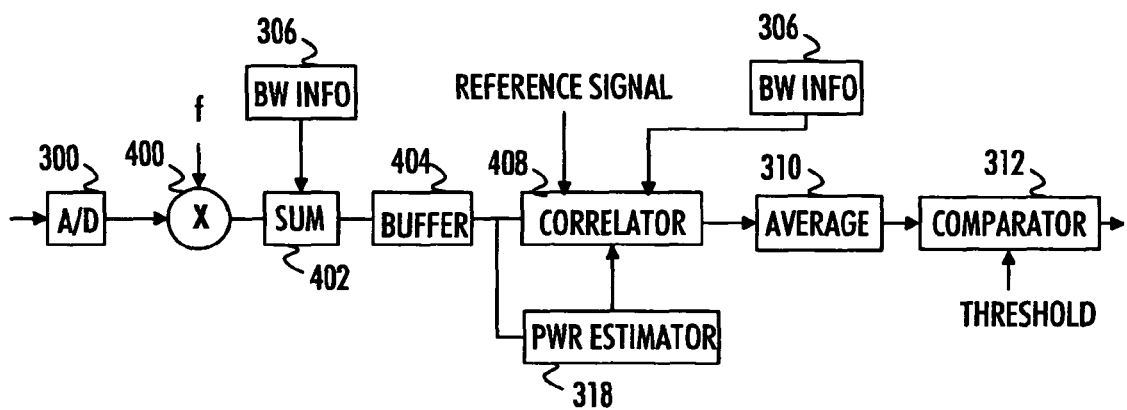
FIG. 4 illustrates another signal detection procedure carried out in a radio receiver according to an embodiment of the invention.

FIG. 4 illustrates another embodiment of the invention. The A/D converter 300 may carry out operations similar to that as described above. If one or more subcarriers carrying the desired signal are not located at the base band, i.e. the desired signal is not at the center of the multicarrier signal the radio receiver is configured to receive, they may be downconverted into the base band in a multiplier 400 by multiplying the signal on the (one or more) subcarriers with a signal having a center frequency f. Then, the signal on these subcarriers may be compared with a reference signal in order to determine whether or not the received signal is the desired signal or noise.

According to this embodiment of the invention, a number of consecutive digital samples of the received signal may be summed together according to the relation between the total bandwidth of the subcarriers known to be carrying the desired signal and the total bandwidth of the received radio signal in order to reduce the sample rate of the received signal. The summation is carried out in a summation unit 402. The number of consecutive samples to be summed is defined by an oversampling definition value, which may be calculated according to equation (1) as the sample shift value N described above. For example, if the number of consecutive samples to be summed is four, the first to the fourth samples are summed together, the fifth to the eighth samples are summed together, and so on. The summation unit 402 may acquire the oversampling definition value from the bandwidth information block 306. As a result of the summation, the sample rate of the resulting signal is one fourth of the original signal. The resulting summed samples are stored into a buffer 404.

A correlator 408 correlates the samples in the buffer 404 with a reference signal. If the reference signal is stored into the memory unit 106 with a sample rate corresponding to the sample rate of the A/D converter 300, the sample rates of the reference signal and the signal in the buffer 404 do not match. The correlator 408 may obtain the oversampling definition value from the bandwidth information block 306 and select samples of the reference signal accordingly. The correlator 408 may obtain every $K^{th}$ sample of the reference signal, where K is the number of consecutive samples summed by the summation unit 402. K may be calculated according to equation (1). Now the correlator 408 may correlate the samples of the signal in the buffer 404 with the corresponding samples of the reference signal. The correlator 408 may now calculate correlation with the sample shift value N being one. Accordingly, there is no need to calculate the phase shift value separately. The rest of the correlation procedure may be carried out as described above. Accordingly, a correlation value for each correlation procedure [calculation of equation (2)] is obtained, its power is normalized, and a decision metric is output. The power estimator 318, the averaging unit 310 and the comparator 312 may operate as described above. Accordingly, the power estimator 318 obtains samples from the buffer (now, the summed samples) and calculates a reception power value.

As mentioned above, the reference signal may be stored in the memory unit 106 of the radio receiver 100. The reference signal may be stored in the memory unit as samples corresponding to the sampling rate of the A/D converter 300. The form of the reference signal stored in the memory unit 106 of the radio receiver 100 is typically implementation-specific. Preferably, the reference signal may be stored as frequency domain samples corresponding to the sampling rate of the A/D converter 300. The stored reference signal may comprise samples containing information corresponding to a situation in which the desired signal the radio receiver 100 is attempting to detect is located at every subcarrier (or at maximum number of subcarriers utilized for transmitting the desired signal) of the OFDM signal the radio receiver 100 is configured to receive. The stored reference signal may then be processed according to the signal structure currently utilized for transmitting the desired signal. Accordingly, the subcarriers known not to be carrying the desired signal may be attenuated, and the reference signal may then be transformed into a time domain through Inverse Fast Fourier Transform (IFFT), for example. Then, the reference signal is fed to the correlator 308 or 408.

Alternatively, the reference signal may be stored as separate samples for each subcarrier. According to the pre-knowledge regarding the number of subcarriers occupied by the desired signal the radio receiver 100 is attempting to detect, the samples of the corresponding subcarriers of the reference signal may be summed for correlation. This solution may be suitable when a large memory capacity is available but the number of calculations carried out by a processing unit is to be minimal.

Figure 5:
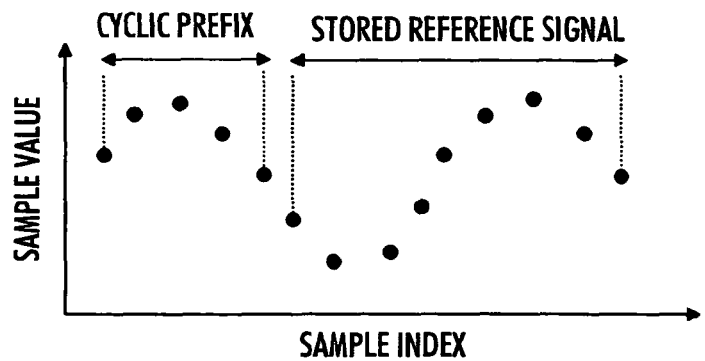
FIG. 5 illustrates a procedure for obtaining a reference signal utilized in a signal detection procedure according to an embodiment of the invention.

In order to reduce the required memory capacity, the reference signal stored into the memory unit 106 may represent only the actual OFDM symbol part of the reference signal used for the correlation. The cyclic prefix part may be separately created for the correlation procedures from the stored OFDM symbol parts of the stored reference signal. FIG. 5 illustrates this cyclic prefix creation procedure for an exemplary stored reference signal. In FIG. 5, the samples of the OFDM symbol part corresponding to the stored reference signal and the samples of the cyclic prefix part are discriminated. The cyclic prefix is created by obtaining from the stored reference signal a number of last samples. The number of obtained samples corresponds to the length of the cyclic prefix known to be used in the desired signal the radio receiver is attempting to detect. The cyclic prefix, i.e. the obtained samples, is then inserted at the start of the reference signal for actual correlation. As can be seen in FIG. 5, the samples of the cyclic prefix have the same sample values as the last five samples of the stored reference signal. In practice, the stored reference signal (the OFDM symbol part) comprises samples which are stored into the memory unit 106 such that each sample has a different memory address. The samples may be stored into successive memory addresses for simplicity. The cyclic prefix part may be inserted into the stored reference signal by setting a starting memory address for the reference signal as:

$$ADD_{start} = ADD_{last} - L_{cp}, \quad (4)$$

where $ADD_{start}$ is the starting memory address, $ADD_{last}$ is the memory address for the last sample of the stored reference signal, and $L_{cp}$ is the length of the cyclic prefix. Accordingly, the reference signal used for actual correlation starts from the sample in the memory location defined by $ADD_{start}$ and continues to $ADD_{last}$. Now the reference signal comprises only the cyclic prefix portion. Next, the actual OFDM symbol part may be added by setting the memory address of the location in which the first sample of the OFDM symbol part is located. Accordingly, the rest of the samples of the OFDM symbol part may be added to the reference signal for actual correlation.

Figure 6:
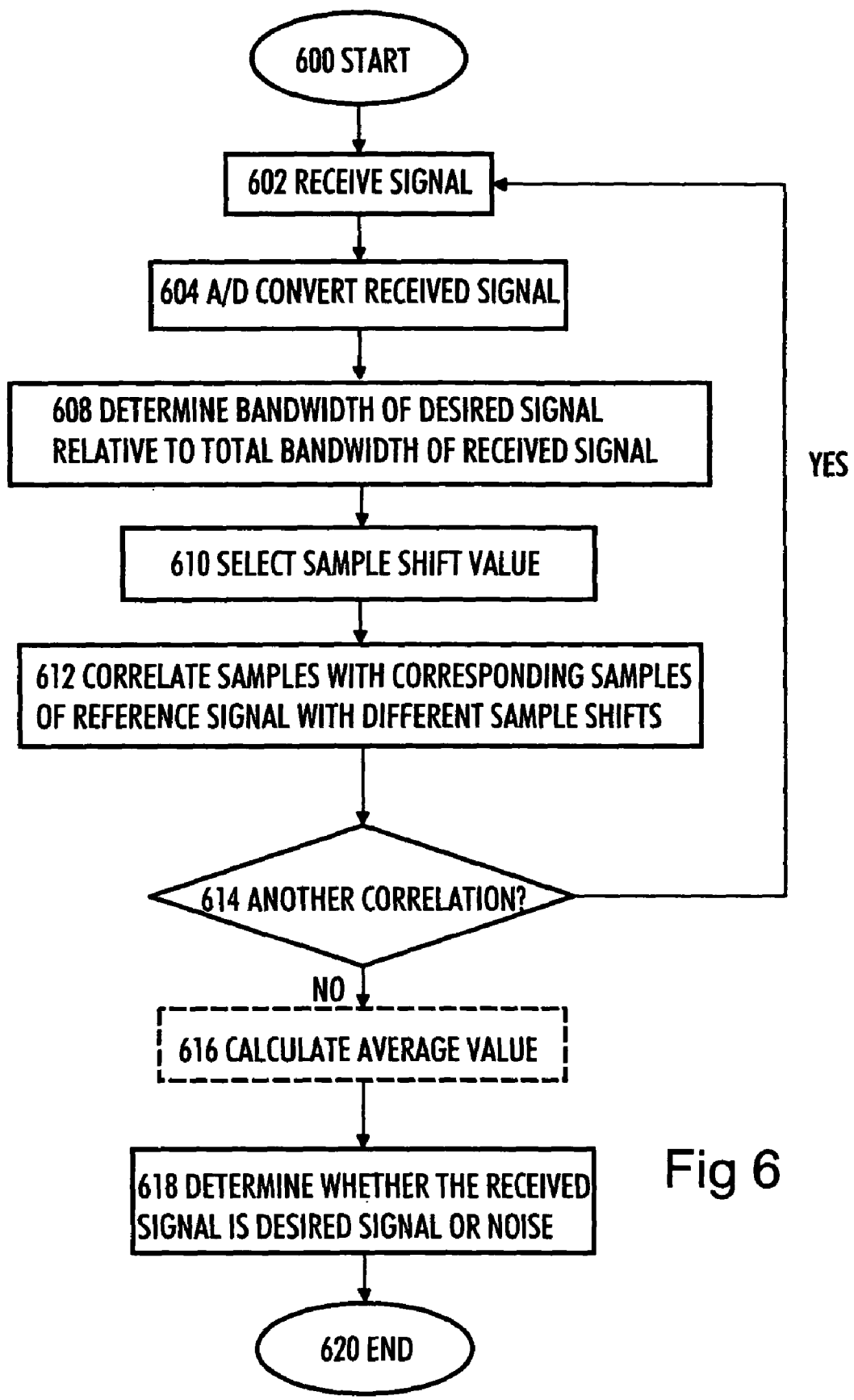
FIG. 6 is a flow diagram illustrating a signal detection process according to an embodiment of the invention.

Next, a signal detection process carried out in a radio receiver according to an embodiment of the invention will be described with reference to the flow diagram in FIG. 6. The process starts in block 600.

In block 602, a radio signal is received in the radio receiver. The received radio signal is analog-to-digital converted in block 604, thus obtaining digital samples of the received radio signal with a given sampling rate.

In block 608, the total bandwidth of one or more subcarriers known to be carrying a desired signal the radio receiver is attempting to detect relative to the total bandwidth of the received radio signal is determined. This may be determined by dividing the total bandwidth of the received radio signal by the total bandwidth of the one or more subcarriers. Alternatively, the number of desired subcarriers relative to the total number of subcarriers in the received radio signal may be determined in block 608.

In block 610, a sample shift value is determined on the basis of the result of the operation carried out in block 608. For example, if it has been determined in block 608 that the total bandwidth of the selected one or more subcarriers is half of the total bandwidth of the received radio signal, the sample shift value may be determined to be two. The sample shift value describes a sample shift to be utilized when correlating the received signal with a reference with different sample shifts.

In block 612, the actual correlation is carried out. Accordingly, the samples of the received signal are compared with the reference signal, thereby obtaining a correlation value describing the similarity between the received signal and the reference signal. The correlation is carried out with different sample shifts between the received signal and the reference signal. The sample shifts to be used are determined according to the sample shift value. Accordingly, a correlation value is obtained, the correlation value being associated with a given phase shift. Additionally, a reception power value may be calculated from the signal samples used for correlation in block 612. From the correlation value and the calculated reception power value, a decision metric may be calculated. The decision metric may be calculated by dividing the correlation value by the reception power value, thereby normalizing the power of the correlation value, i.e. removing the effect of the reception power from the correlation value.

In block 614, it is determined whether or not to calculate another decision metric. If the radio receiver knows that the desired signal the radio receiver is attempting to detect is transmitted several times, the radio receiver may choose to take the advantage of this diversity transmission in order to improve the accuracy of the decision metric. If it is determined in block 614 that another decision metric is to be calculated, the process returns to block 602. If it is determined in block 614 that another decision metric will not be calculated, the process moves to block 616 where an average value of the calculated decision metrics is calculated. If only a single decision metric has been calculated, there is no need to execute block 616.

Then, the process moves to block 618 where the decision metric (or the average value of the decision metrics) is compared with a threshold value. If the decision metric is higher than the threshold value, it is determined that the received signal is the desired signal. On the other hand, if the decision metric is lower than the threshold value, it is determined that the received signal is noise. The process ends in block 620.

Figure 7:
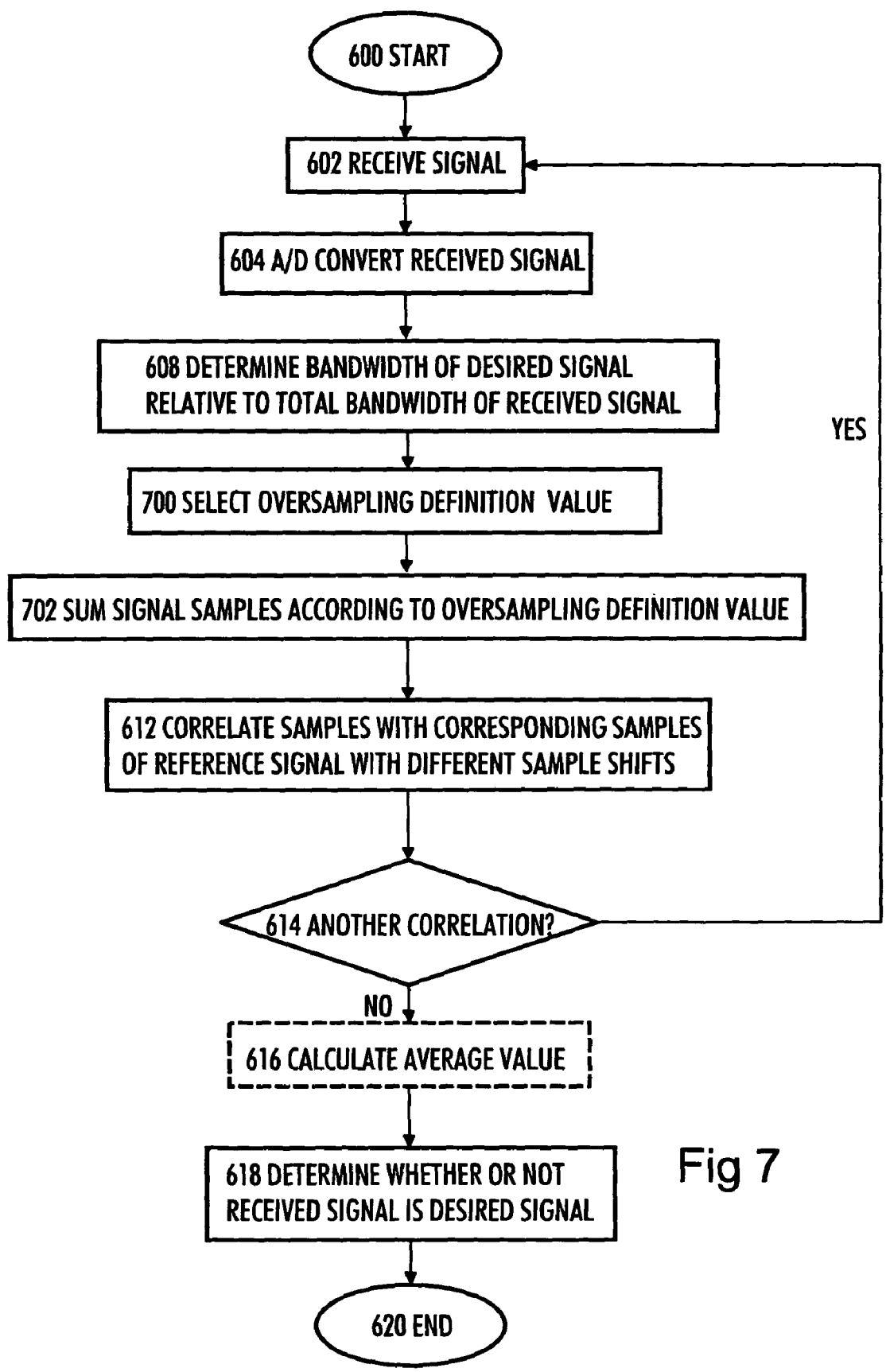
FIG. 7 is a flow diagram illustrating a signal detection process according to another embodiment of the invention.

FIG. 7 illustrates a signal detection process according to another embodiment of the invention. The blocks denoted with the same reference numerals as in FIG. 6 perform the same operations as described with reference to FIG. 6. Accordingly, a radio signal is received, it is A/D converted, and the relation between the bandwidth of the desired signal and the received signal is determined. Then, an oversampling definition value is selected in block 700 on the basis of the operation carried out in block 608. In block 702, a number of consecutive digital signal samples of the received radio signal are summed. The number of samples to be summed is defined by the oversampling definition value. Next, the correlation, the optional averaging and the comparison of the correlation value with the threshold are carried out as described above in conjunction with FIG. 6. The only difference is that now the sample shift value is selected to be one. That is, consecutive correlation procedures are calculated with phase shift between the received signal and the reference signal being one sample.

The embodiments of the invention may be realized in a radio receiver, comprising a communication interface and a processing unit operationally connected to the communication interface. The processing unit may be configured to perform at least some of the steps described in connection with the flowchart of FIG. 6 or 7 and in connection with FIGS. 2 to 5. The embodiments may be implemented as a computer program comprising instructions for executing a computer process for signal detection in the radio receiver 100.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method comprising:
receiving a signal through a radio channel, the signal comprising digital samples, wherein a sampling rate of the digital samples is according to a bandwidth of the received signal;
calculating a sample shift value according to a ratio between the known bandwidth of a desired signal being detected and the total bandwidth of the received signal, wherein the bandwidth of the desired signal is known to be lower than the bandwidth of the received signal;
comparing the digital samples of the received signal with digital samples of a reference signal representing the desired signal, by applying different sample shifts between the two signals in the comparison so as to shift the two signals with respect to each other, the length of the sample shifts being defined by the calculated sample shift value to be higher than one sample when the bandwidth of the desired signal is lower than the bandwidth of the received signal, and by correlating the digital samples of the received signal with the digital samples of a reference signal with the different sample shifts; and
determining, on the basis of whether or not at least one of the correlations results in a match between the received signal and the reference signal, whether or not the received radio signal comprises the desired signal.

2. The method of claim 1, wherein the sample shift value is calculated by dividing the total bandwidth of the received signal by the known bandwidth of the desired signal.

3. The method of claim 1, wherein the radio receiver is configured to receive a multicarrier signal comprising a plurality of subcarriers, and the sample shift value is calculated by dividing the total number of subcarriers in the multicarrier signal by the number of subcarriers known to be carrying the desired signal.

4. The method of claim 3, wherein the radio receiver is a mobile radio receiver configured to receive orthogonal frequency division multiplexing (OFDM) multicarrier signals.

5. The method of claim 4, wherein the reference signal is stored in a memory unit of the radio receiver as samples for one OFDM symbol, the method further comprising:
creating a cyclic prefix for the reference signal by obtaining from the stored reference signal a number of last samples, the number corresponding to the length of the cyclic prefix known to be used in the desired signal the radio receiver is attempting to detect, and
inserting the cyclic prefix to the start of the reference signal for correlation.

6. The method of claim 1, wherein the comparison comprises:
correlating the summed digital samples with digital samples of the reference signal with a given sample shift between the two signals, thereby obtaining a correlation value;
calculating a reception power value from the digital samples;
normalizing the power of the correlation value with the reception power value, thereby obtaining a decision metric, and
comparing the decision metric with a threshold value.

7. The method of claim 1, wherein the signal the radio receiver is attempting to detect is a synchronization signal.

8. The method of claim 1, further comprising:
receiving at least one other signal;
performing the same calculation of the sample shift value and comparison operations for the at least one other signal as were performed for the first-received signal,
averaging the correlation results of the first-received signal and the at least one other signal, and
determining, on the basis of the result of the averaging, whether or not the received signal is the desired signal.

9. The method of claim 1, wherein the digital samples of the received signal and the digital samples of the reference signal are shifted linearly with respect of each other, and wherein the sample shift value defines how much the received signal samples are shifted with respect to the reference signal samples between consecutive correlations.

10. A method comprising:
receiving a signal through a radio channel, the signal comprising digital samples, wherein a sampling rate of the digital samples is according to a bandwidth of the received signal;
calculating an oversampling definition value according to a ratio between the known bandwidth of a desired signal being detected and the total bandwidth of the received signal, wherein the bandwidth of the desired signal is known to be lower than the bandwidth of the received signal;
summing together a number of consecutive samples of the received signal, the number of consecutive samples to be summed being defined by the oversampling definition value, thereby obtaining summed digital samples of the received signal with a reduced sampling rate, wherein the reduction in the sampling rate is defined by the oversampling definition value;
comparing the summed digital samples with digital samples of a reference signal with different sample shifts between the two signals, wherein the reference signal represents the desired signal, and
determining, on the basis of the result of the comparison, whether or not the received radio signal comprises the desired signal.

11. The method of claim 10, the method further comprising selecting for comparison a number of samples of the reference signal corresponding to the number of summed digital samples.

12. The method of claim 10, wherein the comparison comprises:
correlating the summed digital samples with digital samples of the reference signal with a given sample shift between the two signals, thereby obtaining a correlation value;
calculating a reception power value from the summed digital samples;
normalizing the power of the correlation value with the reception power value, thereby obtaining a decision metric, and
comparing the decision metric with a threshold value.

13. A radio receiver comprising:
a processor; and
a memory including computer program code,
the computer program code stored on the memory and processed by the processor, causes the radio receiver at least to receive a signal arranged to comprise digital samples wherein a sampling rate of the digital samples is according to a bandwidth of the received signal, select a sample shift value according to a ratio between the known bandwidth of a desired signal the radio receiver is attempting to detect and the total bandwidth of the received signal wherein the bandwidth of the desired signal is known to be lower than the bandwidth of the received signal, compare the digital samples of the received signal with digital samples of a reference signal representing the desired signal, by applying different sample shifts between the two signals in the comparison so as to shift the two signals with respect to each other, the length of the sample shifts being defined by the calculated sample shift value to be higher than one sample when the bandwidth of the desired signal is lower than the bandwidth of the received signal and by correlating the digital samples of the received signal with the digital samples of a reference signal with the different sample shifts, and determine, on the basis of whether or not at least one of the correlations results in a match between the received signal and the reference signal, whether or not the received signal comprises the desired signal.

14. The radio receiver of claim 13, wherein the computer program code stored on the memory and processed by the processor, causes the radio receiver at least to select the sample shift value by dividing the total bandwidth of the received signal by the known bandwidth of the desired signal.

15. The radio receiver of claim 13, wherein the computer program code stored on the memory and processed by the processor, causes the radio receiver at least to receive, a multicarrier signal comprising a plurality of subcarriers, and select the sample shift value by dividing the total number of subcarriers in the multicarrier signal by the number of subcarriers known to be carrying the desired signal.

16. The radio receiver of claim 13, wherein the computer program code stored on the memory and processed by the processor, causes the radio receiver at least to attempt to detect a synchronization signal.

17. The radio receiver of claim 13, wherein the radio receiver is a mobile radio receiver and the computer program code stored on the memory and processed by the processor, causes the radio receiver at least to receive, through a communication interface, orthogonal frequency division multiplexing (OFDM) multicarrier signals.

18. The radio receiver of claim 17, wherein the memory is operationally connected to the processor and the reference signal is stored in the memory as samples for one OFDM symbol, and the the computer program code stored on the memory and processed by the processor, causes the radio receiver at least to create a cyclic prefix for the reference signal by obtaining from the stored reference signal a number of last samples, the number corresponding to the length of the cyclic prefix known to be used in the desired signal the radio receiver is attempting to detect, and insert the cyclic prefix to the start of the reference signal for correlation.

19. The radio receiver of claim 13, wherein the computer program code stored on the memory and processed by the processor, causes the radio receiver at least to carry out the comparison by correlating the summed digital samples with digital samples of the reference signal with a given sample shift between the two signals, thereby obtaining a correlation value, calculating a reception power value from the summed digital samples, normalizing the power of the correlation value with the reception power value, thereby obtaining a decision metric, and comparing the decision metric with a threshold value.

20. The radio receiver of claim 13, wherein the computer program code stored on the memory and processed by the processor, causes the radio receiver at least to receive, through the radio channel, at least one other radio signal, perform the same calculation of the sample shift value, and correlation operations for the at least one other radio signal as were performed for the first-received radio signal, average the correlation results of the first-received radio signal and the at least one other radio signal, and determine, on the basis of the result of the averaging, whether or not the received radio signal is the desired signal.

21. The radio receiver of claim 13, wherein the digital samples of the received signal and the digital samples of the reference signal are shifted linearly with respect of each other, and wherein the sample shift value defines how much the received signal samples are shifted with respect to the reference signal samples between consecutive correlations.

22. A radio receiver comprising:
a processor; and
a memory including computer program code,
the computer program code stored on the memory and processed by the processor, causes the radio receiver at least to receive,
a signal arranged to comprise digital samples wherein a sampling rate of the digital samples is according to a bandwidth of the received signal, calculate an oversampling definition value according to a ratio between the known bandwidth of a desired signal the radio receiver is attempting to detect and the total bandwidth of the received signal wherein the bandwidth of the desired signal is known to be lower than the bandwidth of the received signal, sum together a number of consecutive samples of the received signal, the number of consecutive samples to be summed being defined by the oversampling definition value, thereby obtaining summed digital samples of the received signal with a reduced sampling rate wherein the reduction in the sampling rate is defined by the oversampling definition value, compare the summed digital samples with digital samples of a reference signal with different sample shifts between the two signals wherein the reference signal represents the desired signal, and determine, on the basis of the result of the comparison, whether or not the received signal comprises the desired signal.

23. The radio receiver of claim 13, wherein the computer program code stored on the memory and processed by the processor, causes the radio receiver at least to select for comparison a number of samples of the reference signal corresponding to the number of summed digital samples.

24. A mobile terminal for use in a wireless communication network, the mobile terminal comprising a radio receiver configured to receive a radio signal, convert the received radio signal into a digitized signal comprising digital samples wherein a sampling rate of the digital samples is according to a bandwidth of the received signal, select a sample shift value according to a ratio between the known bandwidth of a desired signal the radio receiver is attempting to detect and the total bandwidth of the received radio signal wherein the bandwidth of the desired signal is known to be lower than the bandwidth of the received signal, compare the digital samples of the digitized signal with digital samples of a reference signal representing the desired signal, by applying different sample shifts between the two signals in the comparison so as to shift the two signals with respect to each other, the length of the sample shifts being defined by the calculated sample shift value to be higher than one sample when the bandwidth of the desired signal is lower than the bandwidth of the received signal and by correlating the digital samples of the received signal with the digital samples of a reference signal with the different sample shifts, and determine, on the basis of whether or not at least one of the correlations results in a match between the received signal and the reference signal, whether or not the received radio signal comprises the desired signal.

25. A mobile terminal for use in a wireless communication network, the mobile terminal comprising a radio receiver configured to receive a radio signal, convert the received radio signal into a digitized signal comprising digital samples wherein a sampling rate of the digital samples is according to a bandwidth of the received signal, calculate an oversampling definition value according to a ratio between the known bandwidth of a desired signal the radio receiver is attempting to detect and the total bandwidth of the received radio signal wherein the bandwidth of the desired signal is known to be lower than the bandwidth of the received signal, sum together a number of consecutive samples of the digitized received signal, the number of consecutive samples to be summed being defined by the oversampling definition value, thereby obtaining summed digital samples of the digitized received signal with a reduced sampling rate wherein the reduction in the sampling rate is defined by the oversampling definition value, compare the summed digital samples with digital samples of a reference signal with different sample shifts between the two signals wherein the reference signal represents the desired signal, and determine, on the basis of the result of the comparison, whether or not the received radio signal comprises the desired signal.

26. A radio receiver, comprising:
communication means for receiving a radio signal;
means for converting the received radio signal into a digitized signal comprising digital samples, wherein a sampling rate of the digital samples is according to a bandwidth of the received signal;
means for calculating a sample shift value according to a ratio between the known bandwidth of a desired signal the radio receiver is attempting to detect and the total bandwidth of the received radio signal, wherein the bandwidth of the desired signal is known to be lower than the bandwidth of the received signal;
means for comparing the digital samples of the digitized signal with digital samples of a reference signal representing the desired signal, by applying different sample shifts between the two signals in the comparison so as to shift the two signals with respect to each other, the length of the sample shifts being defined by the calculated sample shift value to be higher than one sample when the bandwidth of the desired signal is lower than the bandwidth of the received signal, and by correlating the digital samples of the received signal with the digital samples of a reference signal with the different sample shifts; and
means for determining, on the basis of whether or not at least one of the correlations results in a match between the received signal and the reference signal, whether or not the received radio signal comprises the desired signal.

27. A radio receiver comprising:
communication means for receiving a radio signal;
means for converting the received radio signal into a digitized signal comprising digital samples, wherein a sampling rate of the digital samples is according to a bandwidth of the received signal;
means for calculating an oversampling definition value according to a ratio between the known bandwidth of a desired signal the radio receiver is attempting to detect and the total bandwidth of the received radio signal, wherein the bandwidth of the desired signal is known to be lower than the bandwidth of the received signal;
means for summing together a number of consecutive samples of the digitized received signal, the number of consecutive samples to be summed being defined by the oversampling definition value, thereby obtaining summed digital samples of the digitized received signal with a reduced sampling rate, wherein the reduction in the sampling rate is defined by the oversampling definition value;
means for comparing the summed digital samples with digital samples of a reference signal with different sample shifts between the two signals, wherein the reference signal represents the desired signal; and
means for determining, on the basis of the result of the comparison, whether or not the received radio signal comprises the desired signal.

28. A non-transitory computer program distribution medium readable by a computer and encoding a computer program of instructions for executing a computer process for signal detection in a radio receiver, the process comprising:
receiving a signal comprising digital samples, wherein a sampling rate of the digital samples is according to a bandwidth of the received signal;
calculating a sample shift value according to a ratio between the known bandwidth of a desired signal being detected and the total bandwidth of the received signal, wherein the bandwidth of the desired signal is known to be lower than the bandwidth of the received signal;
comparing the digital samples of the received signal with digital samples of a reference signal representing the desired signal, by applying different sample shifts between the two signals in the comparison so as to shift the two signals with respect to each other, the length of the sample shifts being defined by the calculated sample shift value to be higher than one sample when the bandwidth of the desired signal is lower than the bandwidth of the received signal, and by correlating the digital samples of the received signal with the digital samples of a reference signal with the different sample shifts; and
determining, on the basis of whether or not at least one of the correlations results in a match between the received signal and the reference signal, whether or not the received radio signal comprises the desired signal.

29. A non-transitory computer program distribution medium readable by a computer and encoding a computer program of instructions for executing a computer process for signal detection in a radio receiver, the process comprising:

receiving a signal comprising digital samples, wherein a sampling rate of the digital samples is according to a bandwidth of the received signal;

calculating an oversampling definition value according to a ratio between the known bandwidth of a desired signal being detected and the total bandwidth of the received signal, wherein the bandwidth of the desired signal is known to be lower than the bandwidth of the received signal;

summing together a number of consecutive samples of the received signal, the number of consecutive samples to be summed being defined by the oversampling definition value, thereby obtaining summed digital samples of the received signal with a reduced sampling rate, wherein the reduction in the sampling rate is defined by the oversampling definition value;

comparing the summed digital samples with digital samples of a reference signal with different sample shifts between the two signals, wherein the reference signal represents the desired signal; and determining, on the basis of the result of the comparison, whether or not the received radio signal comprises the desired signal.

* * * * *

UNITED STATES PATENT AND TRADEMARK OFFICE
CERTIFICATE OF CORRECTION

| | | |
|---|---|---|
| PATENT NO. | : 7,864,884 B2 | Page 1 of 1 |
| APPLICATION NO. | : 11/412256 | |
| DATED | : January 4, 2011 | |
| INVENTOR(S) | : Kaj Jansen | |

It is certified that error appears in the above-identified patent and that said Letters Patent is hereby corrected as shown below:

Column 15, line 53, Claim 15: "at least to receive, a" should read --at least to receive a--.

Column 16, line 4, Claim 18: "and the the computer" should read --and the computer--.

Column 16, line 46, Claim 22: "at least to receive, a" should read --at least to receive a--.

Signed and Sealed this
Twelfth Day of April, 2011

David J. Kappos
*Director of the United States Patent and Trademark Office*